No. 829,674. PATENTED AUG. 28, 1906.
A. E. SCHLIEDER.
ACETYLENE GAS GENERATING MACHINE.
APPLICATION FILED JULY 5, 1904.

No. 829,674.  
PATENTED AUG. 28, 1906.  
A. E. SCHLIEDER.  
ACETYLENE GAS GENERATING MACHINE.  
APPLICATION FILED JULY 5, 1904.

Witnesses:
Julius Lankes
B. Waarn

Augustus E. Schlieder
Inventor
Neuhart & Burkhart
Attorneys.

No. 829,674. PATENTED AUG. 28, 1906.
A. E. SCHLIEDER.
ACETYLENE GAS GENERATING MACHINE.
APPLICATION FILED JULY 5, 1904.

Witnesses:
Julius Lankes
B. Mason

Augustus E. Schlieder, Inventor.
By Neukart & Burkhart,
Attorneys.

UNITED STATES PATENT OFFICE.

AUGUSTUS E. SCHLIEDER, OF BUFFALO, NEW YORK, ASSIGNOR TO MONARCH ACETYLENE GAS COMPANY, OF OMAHA, NEBRASKA, A CORPORATION OF NEBRASKA.

ACETYLENE-GAS-GENERATING MACHINE.

No. 829,674.    Specification of Letters Patent.    Patented Aug. 28, 1906.

Application filed July 5, 1904. Serial No. 215,345.

*To all whom it may concern:*

Be it known that I, AUGUSTUS E. SCHLIEDER, a citizen of the United States, residing at Buffalo, in the county of Erie and State of New York, have invented certain new and useful Improvements in Acetylene-Gas-Generating Machines, of which the following is a specification.

My invention relates to acetylene-gas-generating machines of that type in which calcium carbid is automatically fed to the water-receptacle of the gas-generator.

The objects of my invention are to automatically feed a predetermined quantity of calcium carbid into the generating-chamber for the generation of gas, the mechanism controlling the feed being actuated by the rise and fall of the gasometer; to provide an open receptacle into which the calcium carbid is fed and which is submerged into the water in the receptacle; to provide means for discharging a quantity of the water and sediment in the receptacle from the lowest point thereof and to provide means for replenishing the receptacle with a like quantity of fresh water; to provide mechanism intermediate of the valve controlling the feed of calcium carbid and the gasometer, whereby the said valve is actuated to deposit a quantity of carbid in the generator when the gas-bell of the gasometer reaches a predetermined point, and to otherwise improve on acetylene-gas-generators now in use.

With these objects in view the invention consists in the peculiar construction, combination, and arrangement of parts to be hereinafter described, and particularly pointed out in the appended claims.

In the accompanying drawings.

Referring to the drawings in detail, like letters of reference refer to like parts in the several figures.

The reference-letter A designates the gas-generators, which are arranged on opposite sides of the gasometer B.

The gasometer is of the usual type, comprising a suitable fluid or sealing receptacle $b$, containing water, oil, or any other suitable fluid and a gas-bell or holder $b'$, which has its lower open end submerged in the fluid within said receptacle and rises and falls in accordance with the gas-pressure. Gas-supply pipes $b^2$ connect the gasometer with both gas-generators. The gas after entering the gasometer passes through a tube C and enters the gas-bell, from whence it is led through a filter $C'$ to and through the general supply-pipe $C^2$, which may be led to any suitable point or points for consumption. These parts, however, may be otherwise constructed and arranged, as they form no part of this invention. Secured to the gas-bell $b'$ at diametrically opposite points, so as to rise and fall with the same, are two controller-rods $C^3$, each being provided with a vertical slot $c$ and designed to actuate the valve-controlling mechanism, to be hereinafter described.

Each gas-generator A comprises a generating-chamber D, of any suitable shape and having by preference an inclined bottom $D'$, with its lowest point at that side nearest the gasometer. Mounted on each generating-chamber D is a carbid-receptacle E, connected with said generating-chamber by a neck $E'$, forming a passage between the two. Each carbid-receptacle has a suitable opening $e$ at its upper end, through which the carbid is introduced, and each opening is provided with a suitable closure $e'$. The lower end of each of said receptacles is made hopper-like, as shown at $e^2$. The lower hopper-like end of each carbid-receptacle is provided with a supplemental or inner wall $e^3$, which consists of three overlapping sections $e^4$, separated from the outer wall of the hopper for about three-quarters of its circumference by separators $e^5$, said sections with a portion of the outer wall, serving as the confining-wall for the carbid. An inclined extension $e^6$ is held between the neck of the generator and the carbid-receptacle and forms a continuation of a portion of the outer wall of the hopper. The purpose of the inner wall is to reduce the discharge-opening in the hopper without reducing the diameter of the neck to conform thereto, thus allowing the necessary space for free action of the bucket-valve, to be presently described.

In order to prevent packing of the carbid at the lower end of the hopper, cross-bars $e^7$ are placed within the latter near the lower end thereof, said cross-bars being by preference V-shaped in cross-section and serving to loosen and deflect the pieces of carbid from a direct course to the discharge-opening, thus preventing packing of the carbid. Closing the hopper-like ends of the carbid-receptacles are bucket-valves F, which are secured to rock-shafts $F'$, journaled in the walls of the necks $E'$ and in brackets $F^2$, secured to the generating-chambers. Each of said bucket-valves comprises a bottom $f$, sides $f'$, and a curved end wall $f^2$, the latter serving as the valve portion to close the outlet of the carbid-receptacle. The curved end walls $f^2$ of the bucket-valves lie in contact with the extensions $e^6$, but are separated from the end of the inner walls by a space $e^8$. A stop $e^9$ is secured to the inner side of each neck, against which the bucket-valves bear when in a position to receive a charge of carbid, serving to further prevent packing of the carbid.

Supported on the upper end of each gas-generating chamber and extending into the same, so as to be partly submerged in the water therein, is an open-work basket or receptacle G, formed of woven wire or other suitable material, into which the carbid is deposited as it leaves the bucket-valve F. Each of said baskets or receptacles comprises a cylindrical body portion $g$ and a lateral extension $g'$, having its top and end open, the end thereof being secured to the side of the gas-generator, as at $g^2$. A handhole H, provided with a water and gas tight cover $H'$, is formed in each generating-chamber at a point where access can be conveniently had to the said baskets to permit of drawing out stones, wood chips, or other foreign matter that may be among the carbid.

Secured to each rock-shaft $F'$ is the valve-controlling mechanism I, hereinbefore referred to. This mechanism comprises an operating-lever J, fulcrumed on said rock-shaft and secured to a yoke $J'$, which is secured to a rock-bar $J^2$, the said rock-bar and the yoke $J'$ being loosely mounted on said rock-shaft. Formed in the yoke $J'$ at opposite sides of the rock-shaft are two curved slots $j'$, through which and apertures $j'$, formed in the operating-lever J, securing-bolts $j^2$ pass. This construction permits the operating-lever J to be adjusted on the yoke, by means of which adjustment said lever will leave the slot $c$ in the controller-rod $C^3$ sooner or later in the movement of the gas-bell, as will be understood by reference to the operation hereinafter referred to. The rock-bar $J^2$ is provided at opposite ends with notches $j^3$, which are adapted for engagement with pins $k$, projecting from opposite sides of two vertically-movable stop-bars K K'. The latter are guided in their movements within a rectangular frame L, which is supported by the bracket $F^2$ in any approved manner and comprises by preference two parallel bars $l$, connected at their ends by bolts $l'$, passing through the same, and the separators $l^2$, interposed between said bars to form an intervening guide-space $l^3$, in which said stop-bars are confined. Affixed to the rock-shaft F on the opposite side of said lock-bars is a rock-bar M, similar to the rock-bar $J^2$. The rock-bar M is disposed in a plane at an angle to the plane in which the rock-bar $J^2$ is held and, like the latter, is provided at each end with a notch $m$ for engagement with the pins $k$.

Secured to the rock-bar $J^2$ at opposite sides of the rock-shaft are two vertically-movable trips N N', each being provided with a slot $n$, through which a securing-bolt $n'$ passes and enters the lock-bar. $N^2$ is a trip-lever pivotally attached between its ends to the frame L and having a friction-roller $n^2$ at its upper end, which is positioned in the path of the trips N N'. By adjusting the latter on the rock-bar $J^2$ they may be brought into contact with the trip-lever $N^2$ sooner or later in the movement of the said rock-bar. A retractile spring $n^3$, having one of its ends attached to the lower end of said trip-lever and its other end attached to the bracket $F^2$, tends to maintain said trip-lever in a perpendicular position.

The stop-bars K K', which are arranged in line with and on opposite sides of the trip-lever $N^2$, are each provided with an inwardly-extending ear $k'$, against which at different times the trip-lever $N^2$ strikes to release the stop-bars from their locked positions. The said trip-lever $N^2$ is adapted to be actuated by the trips N N' when the rock-bar $J^2$, carrying the latter, is moved to the full extent of its movement in either direction. A retractile spring $k^2$ is secured with one end to the lower end of each stop-bar and with its other end to a suitable fixed point, as at $k^3$, tending to draw said stop-bars down. Each stop-bar has its inner edges notched, as at $k^4$, for engagement with stop-pins O, secured to brackets $o'$, affixed to the frame L.

Figure 17:
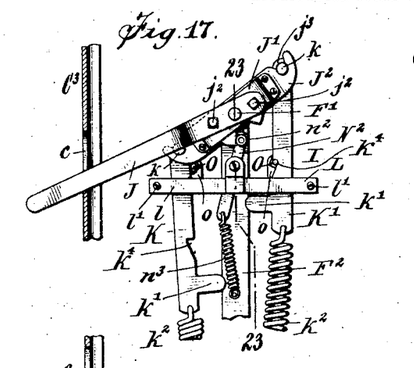
Fig. 17 is a side elevation of the mechanism controlling the actuation of the bucket-valve of one generator and a vertical section of the controller-rod secured to the gas-bell, the parts being shown as they appear when the gas-bell reaches a predetermined point, at which time the bucket-valve is actuated to discharge its contents.
Figure 18:
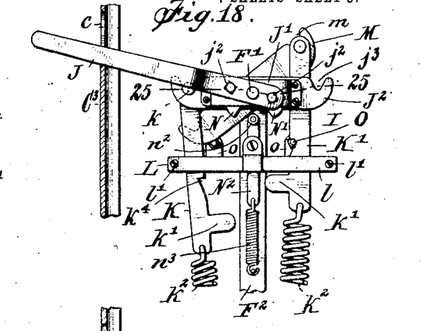
Fig. 18 is a similar view, the several parts being shown as they appear when the gas-bell is being elevated.

The free end of the operating-lever J is at all times held in operative engagement with the controller-rod $C^3$. As shown in Fig. 17, the operating-lever J is in a predetermined position and bears against the lower end of the slot $c$ in the controller-rod $C^3$. This is the position of the controller-rod with reference to the rock-shaft when the gas-bell approaches its lowermost position. At such times the rock-bars $J^2$ and M are parallel and the notches therein engage the pins projecting from the upper ends of the lock-bars K K', one of said lock-bars being drawn downward by its attached spring $k^2$ and the other lock-bar being held in its elevated position by its coacting stop-pin O.

Figure 1:
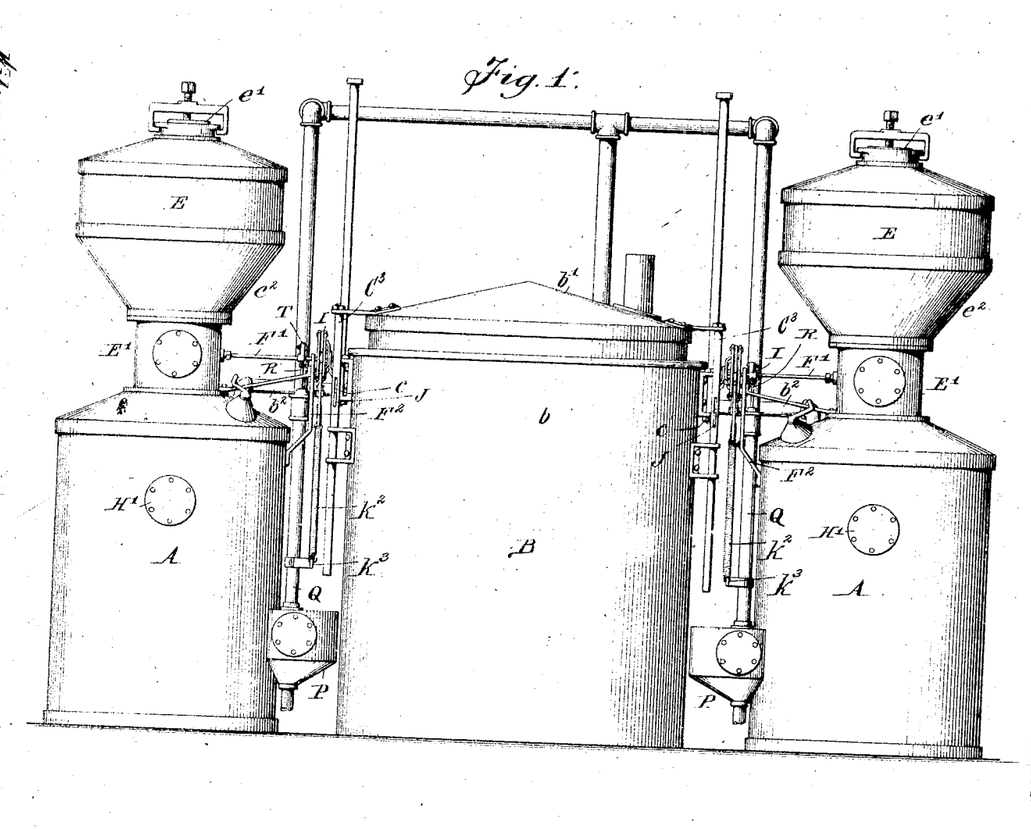
Figure 1 is a front elevation of my improved acetylene-gas-generating machine, showing two generators in connection with a single gasometer.
Figure 2:
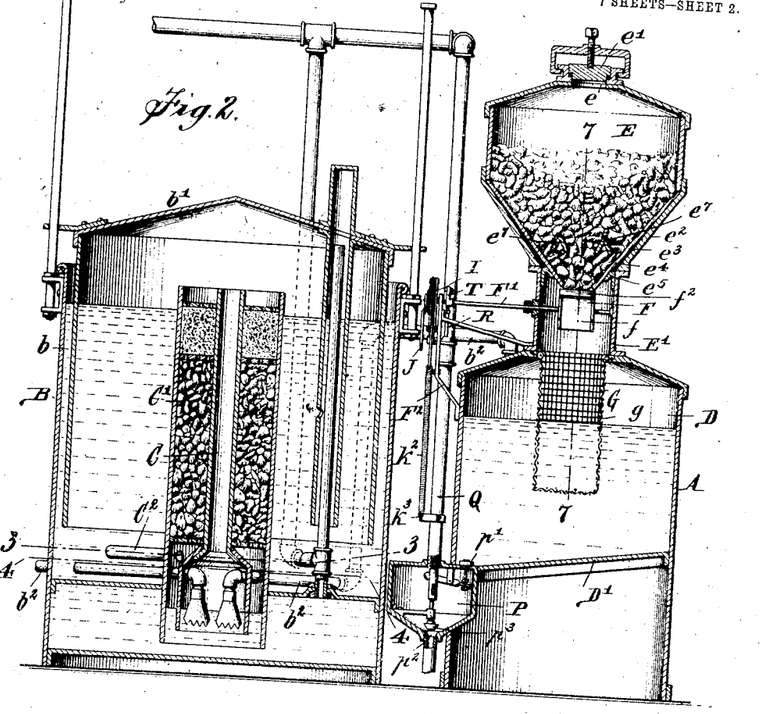
Fig. 2 is a central vertical section of the gasometer and one of the gas-generators.
Figure 3:
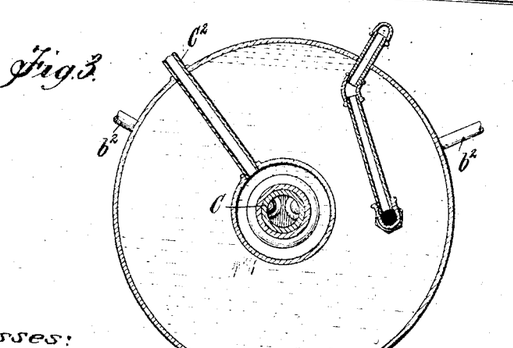
Fig. 3 is a horizontal section taken on line 3 3, Fig. 2.
Figures 4, 5, 6, 7, 8:
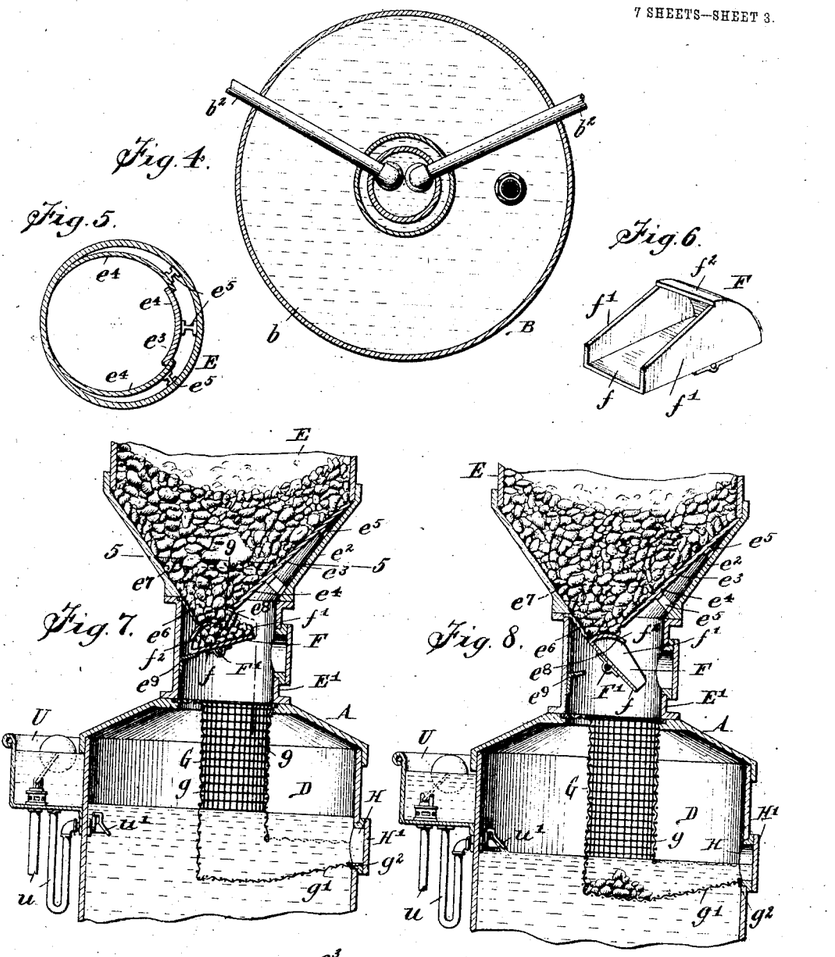
Fig. 4 is a horizontal section taken on line 4 4, Fig. 2.
Fig. 5 is a horizontal section taken on line 5 5, Fig. 7.
Fig. 6 is a detached perspective view of the bucket-valve.
Fig. 7 is an enlarged fragmentary vertical section through one of the gas-generators on line 7 7, Fig. 2, the bucket-valve controlling the feed of carbid being open to receive a supply of carbid.
Fig. 8 is a similar view, the bucket-valve being closed and the contents thereof discharged.
Figure 9:
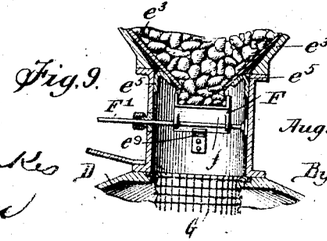
Fig. 9 is a vertical section taken on line 9 9, Fig. 7.
Figure 10:
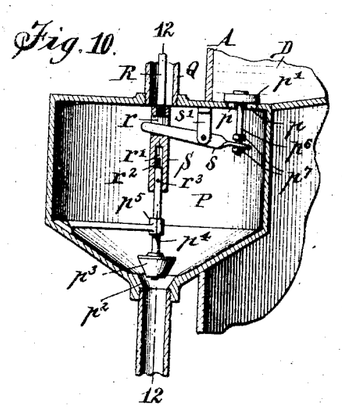
Fig. 10 is an enlarged vertical section of one of the measuring discharge-receptacles and the adjacent portion of the gas-generator to which it is attached, the inlet of the receptacle being closed and the outlet thereof open.
Figure 11:
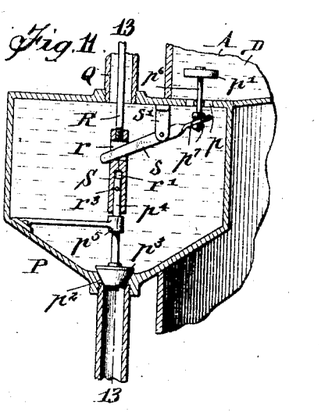
Fig. 11 is a similar view of the said receptacle, the inlet thereof being open and the outlet closed.
Figure 12:
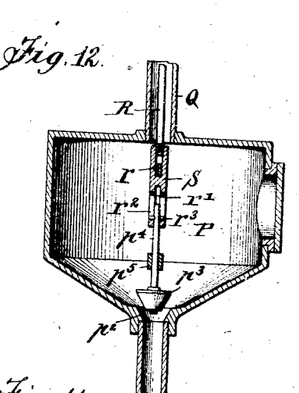
Fig. 12 is a vertical section taken on line 12 12, Fig. 10.
Figure 13:
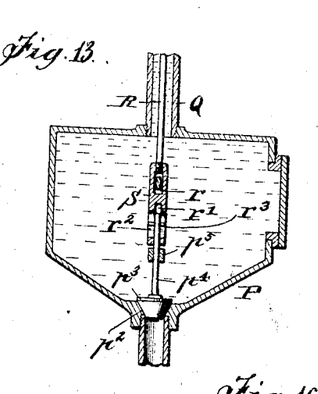
Fig. 13 is a vertical section taken on line 13 13, Fig. 11.
Figure 14:
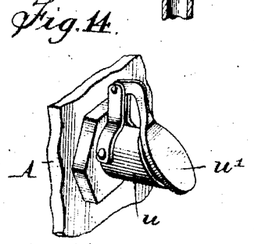
Fig. 14 is a detached perspective view of the flap-valve, one being provided in each generator for closing the water-inlet thereof.
Figures 15, 16:
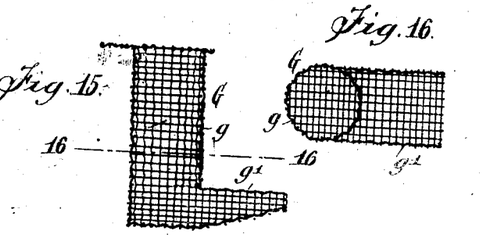
Fig. 15 is an enlarged vertical section of one of the open receptacles or basket into which the calcium carbid is deposited.
Fig. 16 is a horizontal section taken on line 16 16, Fig. 15.
Figures 19, 20, 21, 22:
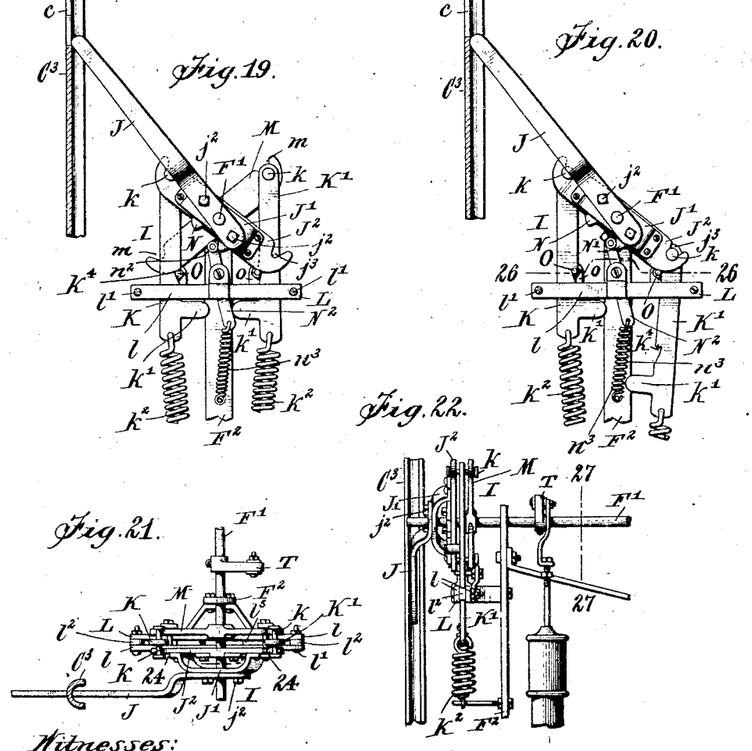
Fig. 19 is a side elevation of the said controlling mechanism, showing the several parts as they appear when about to actuate the bucket-valve so as to receive a new charge of carbid.
Fig. 20 is a similar view showing the several parts of said controlling mechanism as they appear when the bucket is actuated to receive a new charge of carbid, the parts remaining in such position until the gas confined in the gasometer is almost entirely consumed.
Fig. 21 is a top plan view of the controlling mechanism, showing the same in coaction with the controller-rod, the latter being shown in cross-section.
Fig. 22 is a rear elevation of the controlling mechanism.
Figure 23:
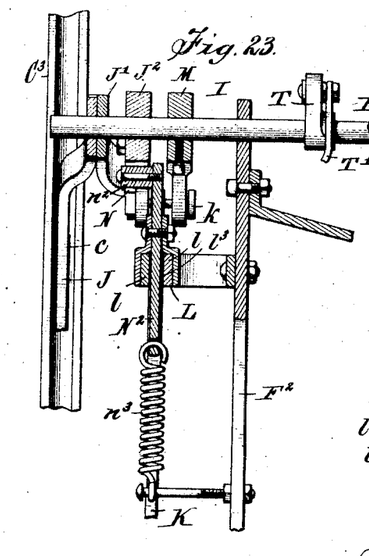
Fig. 23 is an enlarged vertical section taken on line 23 23, Fig. 17.
Figure 24:
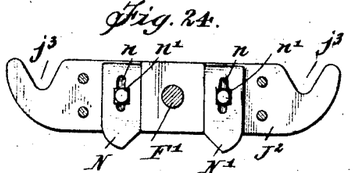
Fig. 24 is an enlarged vertical section taken on line 24 24, Fig. 21.
Figure 25:
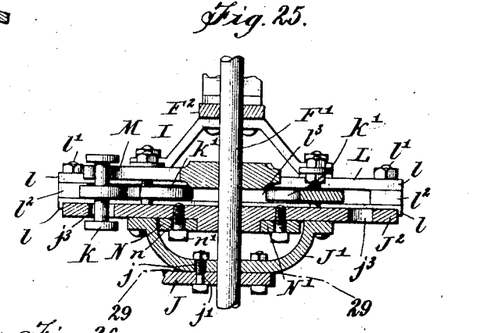
Fig. 25 is an enlarged horizontal section taken on line 25 25, Fig. 18.
Figures 26, 27, 28, 29:
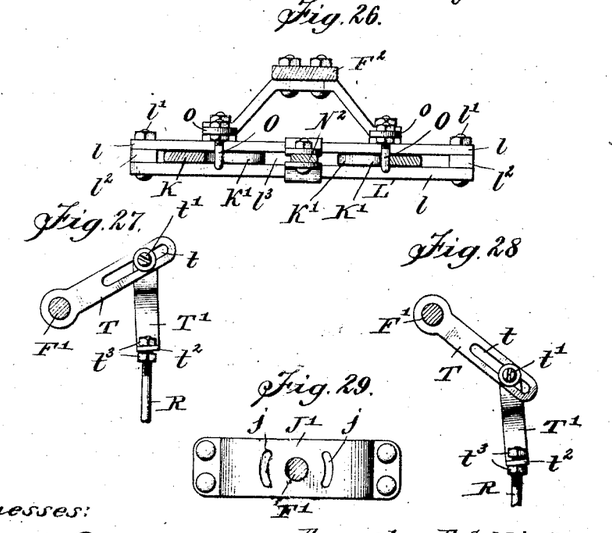
Fig. 26 is an enlarged horizontal section taken on line 26 26, Fig. 20.
Fig. 27 is an enlarged transverse section taken on line 27 27, Fig. 22, the parts being shown in the positions they assume when the gas-bell is at its lowest point.
Fig. 28 is a similar view, the parts being in the positions they assume when the gas-bell approaches or is at its highest point.
Fig. 29 is a vertical section taken on line 29 29, Fig. 25.

When the gas-bell rises, the controller-rod $C^3$ attached thereto causes the operating-lever J to move upward, and as the said lever is attached to the rock-bar $J^2$ through the medium of the yoke J' the said lock-bar is moved with the operating-lever. During this movement of the operating-lever and the rock-bar $J^2$ the trip N on the latter is moved out of contact with the trip-lever $N^2$, which permits the latter to be drawn into a vertical position by the spring $n^3$. The operating-lever J continues to rise with the controller-rod $C^3$ and through the medium of the rock-bar $J^2$ causes the lock-bar K to to be elevated until the coacting stop-pin O engages the notch $k^4$ in said lock-bar, as shown in Fig. 19. Before the said lock-bar is locked in the manner described the trip N' is brought in contact with the trip-lever $N^2$, causing the lower end of the latter to strike the ear $k'$ of the stop-bar K' and force the latter outward until the notch $k^4$ in the said stop-bar is free of its coacting stop-pin O, which occurs simultaneously with the locking of the stop-bar K. At the same time the operating-lever J leaves the slot $c$ in the controller-rod $C^3$ and the free end of the said lever bears against the inner or rear face of the said rod. Further elevation of the controller-rod does not affect the operating-lever and the parts of the controlling mechanism remain in the positions shown in Fig. 20 until the gas-bell drops and the free end of the operating-lever J again enters the slot $c$ in the controller-rod $C^3$. When the lock-bar K is being elevated, as described, the lock-pin $k$ at the upper end thereof leaves the notch $m$ in the rock-bar M and the latter retains its position until the lock-bar K' is released, when the downward movement of the latter causes the rock-bar M to move from the position shown in Fig. 17 to that shown in Fig. 20, and in so doing the rock-shaft F', to which the rock-bar M is affixed, is revolved and the bucket-valve F, which closes the lower end of the carbid-receptacle, as shown in Fig. 8, is moved into the position shown in Fig. 7, thereby opening the lower end of the carbid-receptacle and receiving a quantity of carbid which is to be discharged into the generating-chamber at the proper time.

When the free end of the operating-lever J enters the slot c in the controller-rod C³, which occurs when the gas in the gas-bell is being consumed and the latter drops gradually, the said lever will remain in contact with the lower end of said slot and drop with the controller-rod. During the downward movement of the operating-lever the rock-bar J² is moved from the position shown in Fig. 20 to that shown in Fig. 17, the rock-bar J² disengaging itself from the lock-bar K, while causing the lock-bar K' to be elevated. The movement of the rock-bar J² causes the trip N' to engage the trip-lever N², and the latter in turn engages the lock-bar K and causes the latter to become disengaged from its coacting lock-pin to permit of its being drawn down by the spring K², connected thereto. The said spring causes the rock-bar M to be moved by reason of its connection with the lock-bar K, thereby rocking the shaft F' and moving the bucket-valve from the position shown in Fig. 7 to that shown in Fig. 8, at which time the generating-chamber is supplied with the necessary quantity of carbid, which is discharged from the said bucket-valve.

Secured to the generator and communicating therewith is a measuring discharge-chamber P, which has its upper wall even with the lowermost point of the generator-bottom. A water-inlet $p$ is provided, which is adapted to be closed by a valve $p'$ to prevent the flow of water from the generating-chamber to the said discharge-chamber. The bottom of the latter is provided with an outlet $p^2$, adapted to be closed by a valve $p^3$, having an upwardly-extending valve-stem $p^4$, which is guided in a suitable guide $p^5$, secured to the wall of the chamber. Extending from the top wall of the discharge-chamber to within a short distance of the rock-shaft F is a tube Q, through which a rod R passes and has secured to its lower end by any suitable means a connector S, by means of which the valves $p'$ and $p^3$ are connected together and to the rod R, which latter is adapted to actuate the said valves. The valve $p'$ has a valve-stem $p^6$, which is suitably guided and has two nuts $p^7$ secured thereon. A lever $s$ has one of its ends forked to straddle the valve-stem $p^6$ and lie between the nuts $p^7$, and it is fulcrumed between its ends to a bracket $s'$, secured to the upper wall of said discharge-chamber. The other end of said lever enters a slot $r$ formed in the connector S. The latter is provided with a center bore $r'$, in which the stem of the valve $p^3$ is guided. Intersecting the bore $r'$ of the connector S is a slot $r^2$, which extends through said connector and in which the ends of a guide-pin $r^3$, which projects from opposite sides of the valve-stem $p^4$, is confined. The said guide-pins serve as a means to prevent turning of the valve and also to limit the movement of the latter with respect to the connector S.

Secured to the rock-shaft F is a lever T, having a longitudinal slot $t$ formed therein. A link T' is secured to said lever by means of any suitable connection permitting adjustment along the said slot, but, as illustrated, in preferred form consists of a screw $t'$, passing through said slot and entering a threaded aperture in the link. The latter is bent upon itself at its lower end, as at $t^2$, and has an aperture formed therein through which the upper end of the rod R passes. The said end of the rod is screw-threaded and has two nuts $t^3$ screwed thereon, one above and the other beneath said bent lower end of the link T', sufficient play being allowed the link between the said nuts to adjust itself to the varying conditions which are caused by the lever T swinging through an arc of a circle. The connection of the rod R with the rock-shaft as described causes the said rod to be moved upward when the gas in the gas-bell is about consumed and the bucket-valve is tilted to discharge a quantity of carbid into the generating-chamber, and at such times the valve $p'$ is closed through the medium of the lever $s$, while the valve $p^3$ is opened to permit the water in the discharge-chamber to be discharged. When gas is being generated and the gas-bell is caused to rise by the gas entering the gasometer, the rock-shaft F is revolved when the gas-bell reaches a certain point. This action of the shaft causes the rod R to lower, and in so doing the valve $p^3$ gravitates to its seat and closes the discharge-opening in the discharge-chamber, after which the valve $p'$ is elevated and opens the inlet $p$, thereby allowing a quantity of the water from the generating-chamber to enter the discharge-chamber, from which latter it is discharged when the gas-bell approaches its lowermost point.

As a certain quantity of water is desirable at all times in the gas-generating chamber, provision must be made to supply the exact quantity discharged through the measuring discharge-chamber. This I do by placing into service a float-controlled water-chamber U, which is preferably secured to the wall of the gas-generating chamber, and leading to and from the same is a water-supply pipe $u$, which terminates in the gas-generating chamber and has an inwardly-swinging flap-valve $u'$ secured thereto, which is normally held against the end of the said pipe by the water in the gas-generating chamber, so as to close the said pipe and prevent the entrance of water from the water-tank U. However, at such times when the valve $p'$, controlling the outlet of the gas-generating chamber, is opened and a quantity of the water and the sediments are discharged into the discharge-chamber the water in the generator lowers until the level thereof is below the valve $u'$, at which time the water from the tank U enters the generator, supplying a measured quantity to bring the level of the water to the desired point.

Figure 30:
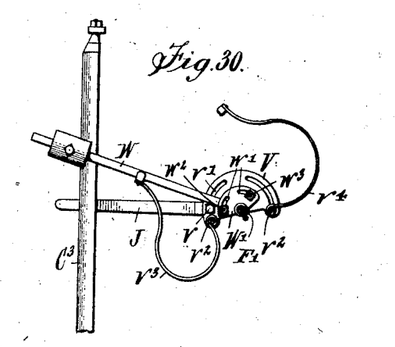
Fig. 30 is a side elevation of a modified form of valve-controlling mechanism, the several parts thereof being shown as they appear when the gas-bell reaches a predetermined point, at which time the bucket-valve is actuated to discharge the contents thereof.
Figure 31:
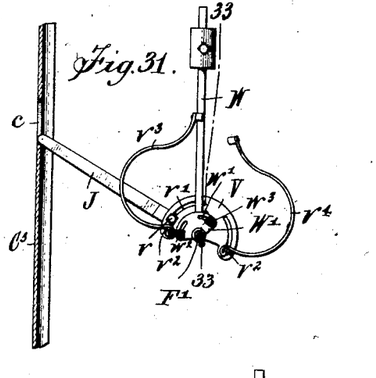
Figs. 31 and 32 are similar views with the parts of the mechanism shown in different positions.
Figure 32:
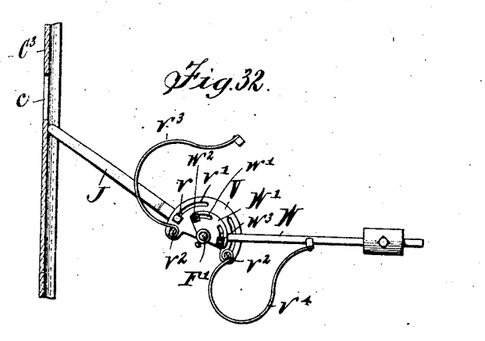
Figure 33:
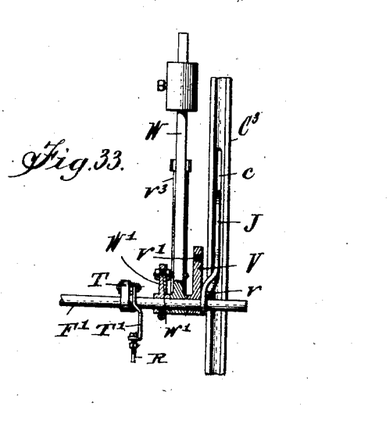
Fig. 33 is an enlarged section taken on line 33 33, Fig. 31.
Figure 34:
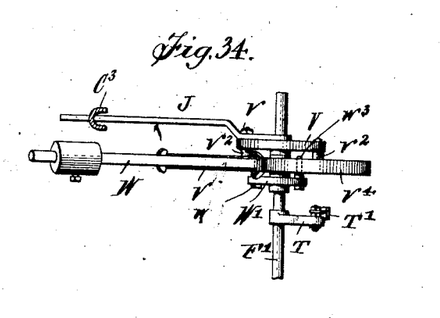
Fig. 34 is an enlarged top plan view of the controlling mechanism, the parts being shown as they appear in Fig. 30.

The modified form of controlling mechanism illustrated in Figs. 30 to 34, inclusive, is provided with rocking members and stop-pins which, like similar parts in the controlling mechanism above described, serve to control the movement of the shaft $F'$, to which the bucket-valve F is secured. In this modified construction the operating-lever J is fulcrumed on the shaft $F'$ and is adjustably secured to a rock member V by means of a bolt $v$ passing through a segmental slot $v'$ and entering the said operating-lever. Secured to laterally-projecting pins $v^2$, arranged on the rock member V, are two substantially U-shaped springs $v^3 v^4$, arranged on a plane in which a weighted lever W is held, said lever being loosely mounted on the rock-shaft, so as to swing thereon. A stop member $W'$ is secured to the shaft $F'$ adjacent the weighted lever W and is provided with two segmental slots $w'$, in each of which a stop-pin $w^2 w^3$ is adjustably held. As shown in Fig. 30, the lever W is adapted to bear against the stop-pin $w^2$ and the spring $v^3$, located between the rock-shaft and the controller-rod $C^3$, when the gas-bell is in its lowermost position, at which time, as hereinbefore stated, the bucket-valve is in a position it assumes after having discharged a quantity of carbid into the generating-chamber for the generation of gas, by the introduction of which latter into the gasometer the gas-bell is elevated, thereby causing the operating-lever J and its connected parts to rock on the shaft $F'$. By this action the weighted lever W, through the medium of the spring $v^3$, is raised and moved away from the stop-pin $w^2$, the said spring moving the lever W beyond a vertical position when the end of the operating-lever J leaves the slot in the controller-rod, which permits said weighted lever to gravitate against the opposite spring $v^4$, placing the latter under tension and striking against the stop-pin $w^3$, thus causing the stop member $W'$ and the rock-shaft $F'$ to rock, whereby the bucket-valve F is moved to the position shown in Fig. 7.

Having thus described my invention, what I claim is—

1. In a gas-generating machine, the combination with the gasometer, of a generating-chamber, a discharge-receptacle having an inlet connecting said receptacle with the generating-chamber, and having also an outlet, a valve for said inlet, a valve for said outlet, a connector connecting said valves to cause either one to close when the other opens, and operative connections between said connector and the gas-bell of the gasometer whereby said valves are actuated by the movement of said gas-bell.

2. In a gas-generator, the combination of the generating-chamber, a water-tank having an inlet-pipe and an outlet-pipe, the latter entering the generating-chamber at a point below the level of the water, and a valve in said generating-chamber and closing the said outlet-pipe, said valve being normally closed and adapted to open when the pressure of the water in the generating-chamber against the same is less than the pressure of water in the said outlet-pipe.

3. In a gas-generating machine, the combination of a generating-chamber, a discharge-receptacle having an inlet leading to said generating-chamber and having also an outlet, a valve for said inlet, a valve for said outlet, a connector having a diametrical slot, a center bore below said slot and a second slot intersecting said bore, a lever pivoted between its ends and having one end thereof entering the first-mentioned slot in said connector and the other end thereof operatively connected to the inlet-valve, the said outlet-valve having its stem entering said bore and being provided with a pin which extends therefrom and enters the slot intersecting said bore, and means for operating said connector to cause either one of said valves to open when the other closes.

4. In a gas-generating machine, the combination of a gas-generating chamber, a superposed carbid-receptacle connected with said generating-chamber by a neck portion and having a hopper-shaped lower end provided with an inner wall arranged to one side of the center of said hopper and having a portion of the outer wall serve as a continuation of the inner wall, said inner wall projecting into said neck portion and serving to form a contracted opening, an extension at one side projecting below the lower end of the inner wall, and a bucket-valve comprising a bottom, sides and a curved end wall serving as a valve-plate, said valve-plate bearing against the lower end of said extension, and being separated from the lower end of the inner wall by an intervening space.

5. In a gas-generating machine, the combination of a gas-generating chamber, a superposed carbid-receptacle having a hopper-like lower end and an outlet at said lower end, the wall at one side of said outlet extending below the wall at the opposite side, a bucket-valve having a curved valve-plate and being capable of retaining a quantity of carbid when opened, said valve-plate acting against the lowest point of said hopper-like receptacle and being separated from the wall at an opposite point by an intervening space, said bucket-valve being adapted to discharge the carbid retained therein, on closing the same.

6. In a gas-generating machine, the combination with a gasometer having a gas-bell, of a generator having a valve controlling the supply of carbid thereto, a shaft on which said valve is affixed, a slotted controller-rod secured to the gas-bell and moving therewith, an operating-lever fulcrumed on said shaft and adapted for engagement with said slotted controller-rod, a rock member loosely mounted on said shaft and having the inner end of the operating-lever secured thereto, and a stop member adapted to be actuated by the movement of said rock member and serving to rock the said shaft.

7. In a gas-generating machine, the combination with the gasometer having the usual gas-bell, of a generator having a valve controlling the supply of carbid thereto, a shaft to which said valve is affixed, a controller-rod secured to and movable with the gas-bell and having a vertical slot therein, an operating-lever fulcrumed on the shaft and having its free end in engagement with said controller-bar, a rock-bar loosely mounted on the shaft and being secured to the inner end of said operating-lever, a rock-bar secured to said shaft, vertically-movable stop-bars located between said rock-bars on opposite sides of the shaft and adapted to be elevated by the first-mentioned rock-bar, means for holding said stop-bars in an elevated position, means for releasing said stop-bars when held in their elevated positions, said releasing means being actuated by the first-mentioned rock-bar, springs serving to lower said stop-bars when released, and connection between the said stop-bars and the second-mentioned rock-bar, whereby the latter is rocked when said stop-bars are lowered, said stop-bars serving to rock the last-mentioned rock-bar in opposite directions.

8. In a gas-generating machine, the combination with a gasometer having the usual gas-bell, a generator having a valve controlling the supply of carbid thereto, a shaft to which said valve is affixed, an operating-lever fulcrumed on said shaft and having its free end in engagement with the gas-bell so as to rise and fall with the same, a rock-bar loosely mounted on the shaft and being secured to said operating-lever, a rock-bar secured to the shaft, stop-bars having each a pin projecting from opposite sides thereof, said pins being adapted to engage the last-mentioned rock-bar to rock the same and to be engaged by the first-mentioned rock-bar to cause the stop-bars to be raised alternately, means for holding the stop-levers when raised, a trip-lever adapted to be engaged by the first-mentioned rock-bar to release the stop-bars when raised, and retractile springs tending to lower the said stop-bars when released by said trip-lever.

9. In a gas-generating machine, the combination with a gasometer having the usual gas-bell, a generator having a valve controlling the supply of carbid thereto, a shaft to which said valve is affixed, an operating-lever fulcrumed on said shaft and having its free end in engagement with the gas-bell so as to rise and fall with the same, a rock-bar loosely mounted on the shaft and being secured to said operating-lever, a rock-bar secured to the shaft, stop-bars having each a pin projecting from opposite sides thereof and a notch in its inner edge, a frame in which said stop-bars are guided, a stop-pin secured to said frame for engagement with each of said notches, the pins projecting from opposite sides of said stop-bars being adapted to engage the last-mentioned rock-bar to rock the same and to be engaged by the first-mentioned rock-bar to cause the stop-bars to be raised alternately, a trip-lever adapted to be actuated by the first-mentioned rock-bar to cause disengagement of the stop-bars from said stop-pins, and retractile springs tending to lower the said stop-bars when released from the stop-pins.

In witness whereof I have affixed my signature in presence of two subscribing witnesses.

AUGUSTUS E. SCHLIEDER.

Witnesses:
CHAS. F. BURKHART,
BERT MASON.